US010900838B1

(12) United States Patent
Podmore et al.

(10) Patent No.: US 10,900,838 B1
(45) Date of Patent: Jan. 26, 2021

(54) WAVEMETER SYSTEM USING A SET OF OPTICAL CHIPS

(71) Applicant: Honeywell International Inc., Morris Plains, NJ (US)

(72) Inventors: Hugh Podmore, Ottawa (CA); Alan Scott, Arnprior (CA)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/578,135

(22) Filed: Sep. 20, 2019

(51) Int. Cl.
*G01J 3/45* (2006.01)
*G01J 3/28* (2006.01)
*G01J 3/18* (2006.01)
*G02B 6/293* (2006.01)

(52) U.S. Cl.
CPC .............. *G01J 3/45* (2013.01); *G01J 3/1809* (2013.01); *G01J 3/1895* (2013.01); *G01J 3/2803* (2013.01); *G02B 6/29301* (2013.01); *G01J 2003/2843* (2013.01)

(58) Field of Classification Search
CPC .......... G01J 3/45; G01J 3/1895; G01J 3/2803; G01J 3/1809; G01J 2003/2843; G01J 9/0246; G02B 6/29301
See application file for complete search history.

(56) References Cited

U.S. PATENT DOCUMENTS

| 5,473,162 | A  | 12/1995 | Busch et al. |
| 6,862,535 | B2 | 3/2005  | Binder |
| 7,115,893 | B1 | 10/2006 | Wood |
| 7,259,856 | B2 | 8/2007  | Kachanov et al. |
| 7,595,887 | B2 | 9/2009  | Spartz et al. |

(Continued)

FOREIGN PATENT DOCUMENTS

| EP | 3270126 A1    | 1/2018 |
| JP | 2006234810 A  | 9/2006 |

(Continued)

OTHER PUBLICATIONS

Kita et al., "High-performance and scalable on-chip digital Fourier transform spectroscopy," Nature Communications 9, article No. 4405, Oct. 23, 2018, 7 pp.

(Continued)

*Primary Examiner* — Jonathan M Hansen
(74) *Attorney, Agent, or Firm* — Shumaker & Sieffert, P.A.

(57) ABSTRACT

This disclosure is related to devices, systems, and techniques for precisely measuring a wavelength of an optical signal. For example, a wavemeter system includes processing circuitry, a detector array, a set of optical chips, and a coarse wavelength unit configured to generate a coarse wavelength measurement of the input optical signal. The processing circuitry is configured to select an optical chip from a plurality of optical chips. The detector array is configured to generate a partial interferogram based on the at least the portion of the input optical signal. The processing circuitry is further configured to calculate an optical spectrum of the input optical signal based on the partial interferogram corresponding to the at least the portion of the input optical signal and the calibration matrix and identify, based on the optical spectrum of the input optical signal, the precise wavelength of the input optical signal.

20 Claims, 9 Drawing Sheets

(56) References Cited

U.S. PATENT DOCUMENTS

| | | |
|---|---|---|
| 8,018,597 B2 | 9/2011 | Scott |
| 8,587,787 B2 | 11/2013 | Reyes et al. |
| 9,638,630 B2 | 5/2017 | Eddy et al. |
| 9,766,099 B2 | 9/2017 | Pechstedt |
| 9,810,627 B2 | 11/2017 | Huang et al. |
| 9,964,396 B1 | 5/2018 | Scott et al. |
| 10,094,215 B2 | 10/2018 | Bright |
| 10,094,773 B2 | 10/2018 | Myshak et al. |
| 10,113,956 B1 | 10/2018 | Li et al. |
| 10,386,237 B2* | 8/2019 | Hu .................. G01J 3/4531 |
| 2007/0077595 A1 | 4/2007 | Koo et al. |
| 2011/0181885 A1 | 7/2011 | Hsu et al. |
| 2014/0264031 A1 | 9/2014 | Fermann et al. |
| 2017/0097302 A1 | 4/2017 | Kreitinger et al. |
| 2018/0052100 A1 | 2/2018 | Babin et al. |
| 2018/0128592 A1 | 5/2018 | Scott et al. |
| 2020/0003620 A1* | 1/2020 | Deck .................. G01J 3/26 |

FOREIGN PATENT DOCUMENTS

| | | |
|---|---|---|
| WO | 2017201548 A1 | 11/2017 |
| WO | 2018175524 A1 | 9/2018 |

OTHER PUBLICATIONS

Podmore et al., "A compressive-sensing Fourier-transform spectrometer chip using subwavelength grating waveguides," Optics Letters, Jan. 18, 2017, 4 pp.

Schuyler et al., "Unmanned Aerial Systems for Monitoring Trace Tropospheric Gases," MDPI, Atmosphere Journal, Oct. 23, 2017, 16 pp.

Villa et al., "An Overview of Small Unmanned Aerial Vehicles for Air Quality Measurements: Present Applications and Future Prospectives," MDPI, Sensors Journal, Jul. 12, 2016, 29 pp.

U.S. Appl. No. 16/363,864, filed Mar. 25, 2019, naming inventors Podmore et al.

* cited by examiner

WAVEMETER SYSTEM USING A SET OF OPTICAL CHIPS

TECHNICAL FIELD

This disclosure relates to wavemeter systems.

BACKGROUND

Precision metrology systems (e.g., gravimeters for mining and geosciences, laser interferometers for gravitational wave observatories, ring laser gyroscopes for inertial navigation, and atomic clocks for geo-positioning systems) may rely on ultra-stable narrow-linewidth laser systems emitting a precisely calibrated optical frequency. Such precision metrology systems may use precisely calibrated optical frequency sources (e.g., lasers locked to atomic transitions) to provide an absolute reference against which a measurement of a local disturbance (e.g., gravity field or angular rotation) may be measured.

SUMMARY

In general, this disclosure is directed to devices, systems, and techniques for precisely determining a wavelength of an input optical signal. More specifically, the disclosure describes techniques for determining the wavelength of the input optical signal using a wavemeter system including a plurality of optical chips that each include multiple interferometers. For example, the wavemeter system may detect an output from only optical chip(s) that correspond to a coarse wavelength measurement of an input optical signal being detected. In this way, the wavemeter system may reduce uncertainty in the wavelength estimate of the input optical signal, which may then increase an accuracy of a secondary, precise wavelength measurement determined by the wavemeter system compared to systems that use an output from all of the optical chips.

In some examples, a wavemeter system includes processing circuitry in communication with a memory configured to store a calibration matrix, a detector array, a set of optical chips, and a coarse wavelength unit configured to generate a coarse wavelength measurement of the input optical signal. The processing circuitry is configured to select an optical chip from a plurality of optical chips, the optical chip corresponding to the range of wavelengths identified in the coarse wavelength measurement. The detector array is configured to generate a partial interferogram based on the at least the portion of the input optical signal. The processing circuitry is further configured to calculate an optical spectrum of the input optical signal based on the partial interferogram corresponding to the at least the portion of the input optical signal and the calibration matrix and identify, based on the optical spectrum of the input optical signal, the precise wavelength of the input optical signal.

In some examples, a method for determining a precise wavelength of an input optical signal using a wavemeter device includes generating, by a coarse wavelength unit of the wavemeter device, a coarse wavelength measurement of the input optical signal, selecting, by processing circuitry of the wavemeter device, an optical chip from a plurality of optical chips, the optical chip corresponding to the range of wavelengths identified in the coarse wavelength measurement, and generating, using a detector array coupled to the optical chip, a partial interferogram based on the at least the portion of the input optical signal. Additionally, the method includes calculating, by the processing circuitry, an optical spectrum of the input optical signal based on the partial interferogram corresponding to the at least the portion of the input optical signal and a calibration matrix for the wavemeter device, and identifying, by the processing circuitry and based on the optical spectrum of the input optical signal, the precise wavelength of the input optical signal.

In some examples, a wavemeter device is configured for determining a precise wavelength of an input optical signal. The wavemeter device is configured to generate, by a coarse wavelength unit of the wavemeter device, a coarse wavelength measurement of the input optical signal, select, by processing circuitry of the wavemeter device, an optical chip from a plurality of optical chips, the optical chip corresponding to the range of wavelengths identified in the coarse wavelength measurement, and generate, using a detector array coupled to the optical chip, a partial interferogram based on the at least the portion of the input optical signal. Additionally, the wavemeter device is configured to calculate, by the processing circuitry, an optical spectrum of the input optical signal based on the partial interferogram corresponding to the at least the portion of the input optical signal and a calibration matrix for the wavemeter device, and identify, by the processing circuitry and based on the optical spectrum of the input optical signal, the precise wavelength of the input optical signal.

The summary is intended to provide an overview of the subject matter described in this disclosure. The summary is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
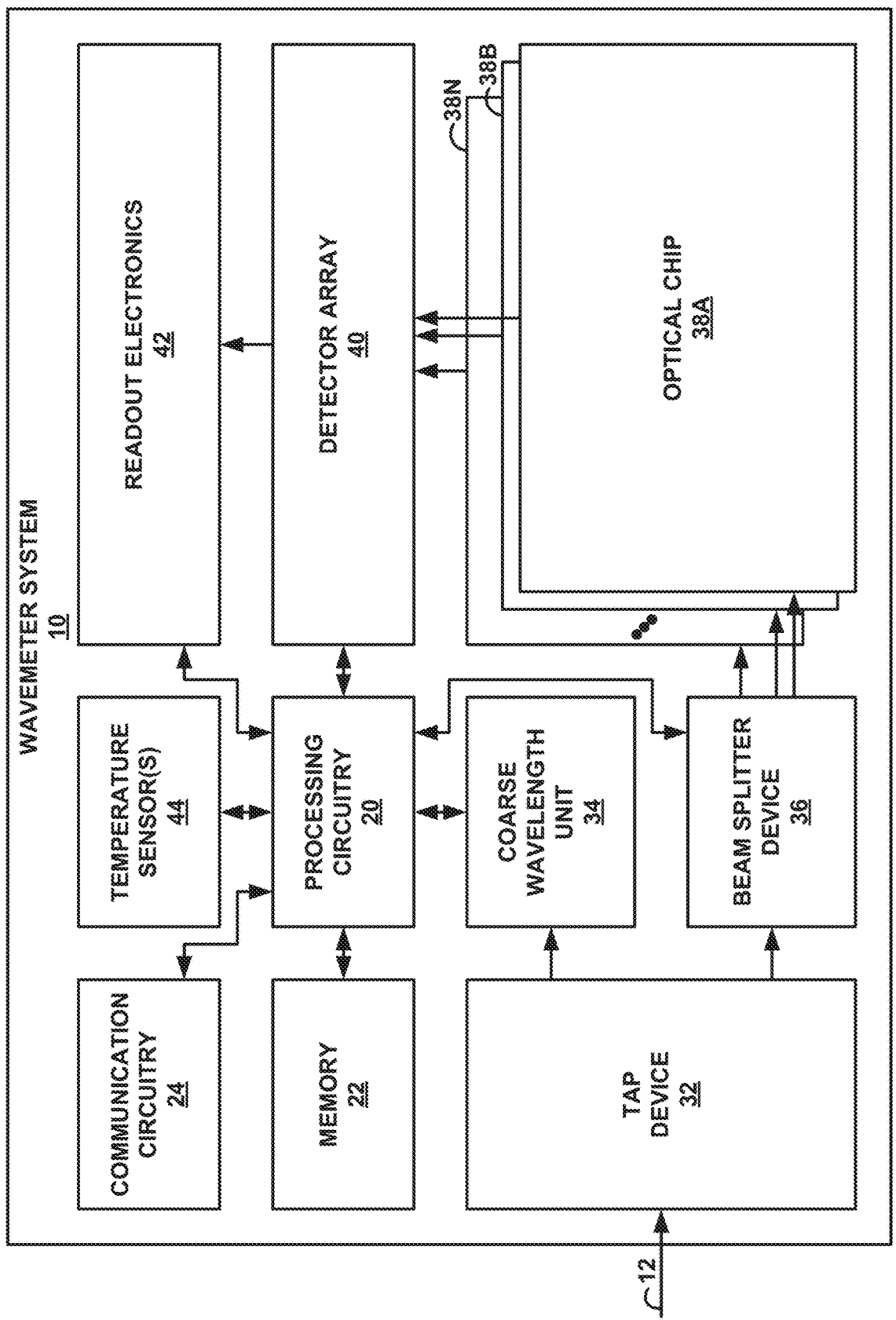
FIG. 1 is a block diagram illustrating a wavemeter system, in accordance with one or more techniques of this disclosure.

This disclosure describes devices, systems, and techniques for precisely determining a wavelength of an input optical signal using a wavemeter system including a plurality of optical chips. For example, the wavemeter system may precisely determine the wavelength of the input optical signal via a particular optical chip of the plurality of optical chips, the wavelength of the optical signal falling within a range of wavelengths corresponding to the particular chip. In this way, because each optical chip may correspond to a different range of wavelengths, the plurality of optical chips may collectively be able to process optical signals over a band of wavelengths, where the band of wavelengths is wider than the respective range of wavelengths corresponding to each individual optical chip of the plurality of optical chips. In some examples, determining the wavelength of the input optical signal using a particular optical chip of the plurality of optical chips may result in the wavemeter system generating a more accurate wavelength value compared to systems that use all of the optical chips. For example, the particular optical chip may include a set of interferometers that yield a higher quality interferogram (e.g., more accurate) for precisely calculating the wavelength of the input optical signal compared to interferometers of other optical chip(s) of the plurality of optical chips.

In some cases, precision metrology systems including gravimeters for mining and geosciences, laser interferometers for gravitational wave observatories, ring laser gyroscopes for inertial navigation, and atomic clocks for geopositioning systems may rely on ultra-stable narrow-linewidth, laser systems emitting a precisely calibrated optical frequency. Such systems may use precisely calibrated optical frequency sources (e.g., a laser locked to an atomic transition) to provide an absolute reference against which a measurement of some local disturbance (e.g., gravity field and angular rotation) may be measured. However, over a lifetime of the precision metrology systems, the optical frequency of some laser systems may drift due to temperature and pressure fluctuations, radiation darkening of the laser cavity, or excess free-carrier injection (e.g., in the case of laser diodes). Development and maintenance of these precision laser systems, therefore, may use periodic calibration with respect to an absolute frequency reference. A wavemeter system, on the other hand, may only need to be calibrated once for temperature fluctuations. A set of calibration matrices may be determined to cover a range of temperatures such that processing circuitry may select, based on a temperature of a plurality of optical chips, a calibration matrix corresponding to the temperature of the plurality of optical chips. In this way, the wavemeter system may not need to be re-calibrated due to temperature fluctuations.

Calibration of precision laser systems, in some cases, may be carried out using expensive benchtop-sized optical instruments including a variable-length interferometric cavity, detector, readout electronics and a periodically calibrated lookup table for translating the detector signal to an optical frequency measurement. These wavemeters, which in some cases are Michelson interferometers (e.g., systems configured to produce interference fringes by splitting a beam of monochromatic light into a first beam that is directed to a fixed mirror and a second beam that is directed to a movable mirror), are sensitive to vibration and shock and contain moving parts which are prone to misalignment and mechanical failure. Such devices may be expensive to produce and may be limited to operation over the waveband of a single detector (e.g., 450 nm-1100 nm for silicon detectors, or 800 nm-1700 nm for Indium Gallium Arsenide (InGaAs) detectors, but not 450 nm-1700 nm).

A wavemeter system, on the other hand, could instead carry out precision frequency calibration using interferometric measurements obtained via integrated optical chips. The wavemeter system, for example, may include one or more arrays of waveguide interferometers of varying optical path delays printed on optical chips, with readout performed by integrated photodetectors, a linear detector array or 2-D array of photodetectors. In some examples, the wavemeter system may be manufactured at wafer scale at a relatively low cost using relatively low-cost optical detectors compared to larger wavemeter systems with more moving parts. Additionally, the wavemeter system may use compressive sensing techniques to reduce pixel density. The wavemeter system may be robust to mechanical disturbances and may have a relatively small size such that the wavemeter system is suitable for integration into satellite systems to provide an absolute optical frequency reference.

In some cases, the wavemeter system may be implemented using a photonic integrated circuit, thus improving a manufacturing efficiency compared with other systems that are not implemented using photonic integrated circuits. Additionally, the wavemeter system may use compressive sensing to achieve high spectral resolution over a large optical bandwidth without requiring the use of an onboard calibration reference, thus decreasing a size and improving an efficiency of the wavemeter system compared with systems that do not use compressive sensing.

Optical wavemeters, especially optical wavemeters based on Michelson interferometers, may be delicate instruments that are frequently re-calibrated due to mishandling. The described wavemeter system may use vibration-insensitive planar waveguides in order to deliver a smaller, lighter, and more robust system that may be delivered at lower cost through wafer-scale manufacturing, without requiring frequent re-calibration. A low cost of optical components included in the wavemeter system (including the use of lower-cost detectors) may allow an integrated-optics wavemeter to address both infrared and visible wavelengths, an improvement over technologies which address only a single waveband.

The wavemeter system, in some cases, may perform a coarse wavelength measurement after receiving the input optical signal from an optical signal source. The coarse wavelength measurement, in some cases, may represent a measurement of the wavelength of the input optical signal. For example, the coarse wavelength measurement may identify a range of wavelengths that the wavelength of the input optical signal lies within. In this way, the coarse wavelength measurement may return a "rough estimation" of the wavelength, where the rough estimation is sufficient for processing circuitry of the wavemeter system to select an optical chip for processing the input optical signal. The wavemeter system may select an optical chip from the plurality of optical chips that is configured for accurately processing an optical signal within a range of wavelengths that encompasses or overlaps with the coarse wavelength measurement. In other words, the processing circuitry may select the optical chip that is configured to process the input optical signal more accurately (e.g., to a greater degree of precision) than each other optical chip of the plurality of optical chips. The optical chip may employ compressive sensing in order to achieve a high degree of accuracy. For example, the processing circuitry may select the optical chip that is configured for a wavelength range corresponding to the coarse wavelength measurement, and is configured to process the input optical signal to yield a partial interferogram with a reduced amount of base level noise, which may produce a more accurate wavelength measurement compared to if the processing circuitry selects any of the other optical chips of the plurality of optical chips.

After selecting the optical chip from the plurality of optical chips, a beam splitter device of the wavemeter system may direct at least a portion of the input optical signal to the optical chip. In some cases, the processing circuitry may control the beam splitter device to direct the portion of the input optical signal to the optical chip. In some cases, the processing circuitry may control a size of the portion of the input optical signal directed to the optical chip. In turn, the optical chip may process the optical signal and deliver the processed optical signal to a detector array. When the optical chip processes the input optical signal, the optical chip may execute a complete Fourier transform or a partial Fourier transform of the optical signal. For example, the detector array may capture a partial interferogram consisting of partial samples of the complete Fourier transform of the optical signal (e.g., the interferogram) based on the input optical signal which passes through the optical chip. In some examples, the detector array may capture the partial interferogram using a set of photodetectors which generate an electrical signal in response to receiving an optical signal. Subsequently, the processing circuitry may calculate an optical spectrum of the input optical signal based on the partial interferogram and a calibration matrix and identify a precise wavelength of the input optical signal, based on the optical spectrum, that is more precise (e.g., to a greater degree of accuracy) than the coarse wavelength measurement.

The wavemeter system may use a plurality of waveguide chips, each of which addresses a different optical bandwidth. As such, the wavemeter system may represent a system with optional expanded wavelength range. The wavemeter system may use compressive sensing to enable this expanded wavelength range in a practical manner. As such, the wavemeter system may use smaller, more readily-available and inexpensive photodetectors as compared with systems that do not use compressive sensing. Further substantial efficiency improvements may be generated through wafer-scale manufacturing of the wavemeter system.

The techniques of this disclosure may provide one or more advantages. For example, by performing the coarse wavelength measurement to obtain the rough estimation of the wavelength of the input optical signal, the wavemeter system may be configured to select the optical chip that most effectively processes the input optical signal as compared with other optical chips and prevent the input optical signal from passing through optical chips that do not process the input optical signal as effectively as the selected optical chip. In this way, the wavemeter system may select the optical chip from the plurality of optical chips that processes the input optical signal to produce a more precise wavelength measurement compared to if other chips of the plurality of optical chips process the input optical signal. Additionally, by using the compressive sensing retrieval operation (e.g., including l1-norm minimization) to calculate the optical spectrum of the input optical signal, the wavemeter system may decrease the size of the partial interferogram for calculating the optical spectrum, which may decrease a number of detectors in the detector array, as well as decrease a physical size of the optical chips—allowing more practical fabrication—and may help to reduce or eliminate a calibration reference in the wavemeter system.

FIG. 1 is a block diagram illustrating a wavemeter system 10, in accordance with one or more techniques of this disclosure. As illustrated in FIG. 1, wavemeter system 10 includes processing circuitry 20, memory 22, communication circuitry 24, tap device 32, coarse wavelength unit 34, beam splitter device 36, optical chips 38A-38N (collectively, "optical chips 38"), detector array 40, readout electronics 42, and temperature sensor(s) 44.

Wavemeter system 10 may, in some examples, be configured to precisely determine a wavelength of input optical signal 12 by performing a coarse wavelength measurement of input optical signal 12, selecting an optical chip from optical chips 38 based on the coarse wavelength measurement, directing at least a portion of input optical signal 12 to the optical chip, capturing a partial interferogram using detector array 40, and calculating a precise wavelength of input optical signal 12 based on the partial interferogram.

Processing circuitry 20 may include one or more processors implemented in circuitry that are configured to implement functionality and/or process instructions for execution within wavemeter system 10. For example, processing circuitry 20 may be capable of processing instructions stored in a memory (e.g., memory 22). Processing circuitry 20 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 20 may include any suitable structure, whether in hardware, software, firmware, or any combination thereof, to perform the functions ascribed herein to processing circuitry 20.

Memory 22 may be configured to store information within wavemeter system 10 during operation. Memory 22 may include a computer-readable storage medium or computer-readable storage device. In some examples, memory 22 includes one or more of a short-term memory or a long-term memory. Memory 22 may include, for example, random access memories (RAM), dynamic random-access memories (DRAM), static random access memories (SRAM), magnetic discs, optical discs, flash memories, or forms of electrically programmable memories (EPROM) or electrically erasable and programmable memories (EEPROM). In some examples, memory 22 is used to store data indicative of instructions for execution by processing circuitry 20.

Communication circuitry 24 may include any suitable hardware, firmware, software or any combination thereof for communicating with one or more other devices. Under the control of processing circuitry 20, communication circuitry 24 may receive downlink telemetry from, as well as send uplink telemetry to the one or more other devices. In addition, processing circuitry 20 may communicate with a networked computing device via a computer network. Communication circuitry 24 may include any combination of a Bluetooth® radio, an electronic oscillator, frequency modulation circuitry, frequency demodulation circuitry, amplifier circuitry, and power switches such as a metal-oxide-semiconductor field-effect transistor (MOSFET), a bipolar junction transistor (BJT), an insulated-gate bipolar transistor (IGBT), a junction field effect transistor (JFET), or another element that uses voltage and/or current for control.

Tap device 32 may be configured to receive input optical signal 12 as input optical signal 12 arrives at wavemeter system 10. In some cases, tap device 32 may receive input optical signal 12 from an optical signal source (not illustrated in FIG. 1). Tap device 32 may be configured to "tap" input optical signal 12 such that a first portion of input optical signal 12 is directed to coarse wavelength unit 34 while a second portion of input optical signal 12 is directed to beam splitter device 36, where the second portion is larger than the first portion. In some examples, tap device 32 may include one or more beam splitters. In some cases, the first portion of input optical signal 12 represents 10% of input optical signal 12 and the second portion of input optical signal 12 represents 90% of input optical signal 12. In other cases, the first portion and the second portion may represent other proportions of input optical signal 12. For example, the first portion may be within a range that extends from 1% of input optical signal 12 to 90% of input optical signal 12 and the second portion may substantially include the remainder of input optical signal 12 that is not part of the first portion. For example, the second portion may include greater than 95% of the remainder of input optical signal 12 that is not part of the first portion.

In some examples, coarse wavelength unit 34 performs, using processing circuitry 20, a coarse wavelength measurement of the first portion of input optical signal 12. For example, coarse wavelength unit 34 may be configured to determine that the wavelength of input optical signal 12 is within a range of wavelengths that is greater than 2.5 nm wide. In this way, the coarse wavelength measurement may return a rough estimation of the wavelength of input optical signal 12. In some examples, coarse wavelength unit 34 performs the coarse wavelength measurement using arrayed waveguide grating (AWG). In at least some examples where coarse wavelength unit 34 performs the coarse wavelength measurement using AWG, coarse wavelength unit 34 may act as a demultiplexer that separates input optical signal 12 into a set of wavelength components and outputs the set of wavelength components for analysis to determine which wavelength component has a largest magnitude. In some examples, coarse wavelength unit 34 may perform the coarse wavelength measurement using an Echelle grating. In at least some examples where coarse wavelength unit 34 performs the coarse wavelength measurement using Echelle grating, coarse wavelength unit 34 may use diffraction to separate a set of wavelength components of input optical signal 12 such that processing circuitry 20 is configured to analyze the set of wavelength components in order to measure the wavelength of input optical signal 12.

Beam splitter device 36 may be configured to direct at least a part of the second portion of input optical signal 12 to one or more of optical chips 38. In some examples, beam splitter device 36 includes one or more beam splitters. Processing circuitry 20 may control beam splitter device 36 such that processing circuitry 20 is configured to control which one or more of optical chips 38 that the second portion of input optical signal 12 is directed to by beam splitter device 36. For example, processing circuitry 20 may determine, based on the coarse wavelength measurement, that the wavelength of input optical signal 12 is within a particular range of wavelengths. For example, processing circuitry 20 may select an optical chip (e.g., optical chip 38A) of optical chips 38 that is configured with the range of wavelengths. Each optical chip of optical chips 38 may correspond to a respective range of wavelengths. For example, optical chip 38A may be configured to process optical signals at a first frequency range (e.g., 1563.86 nm to 1546.12 nm, corresponding to the first 22 channels of the C-band) and optical chip 38B may be configured to process optical signals at a second frequency range (e.g., 1546.12 nm to 1528.77 nm corresponding to the following 22 channels of the C-band).

The range of wavelengths corresponding to a particular optical chip may represent a band of optical signal wavelengths which the particular optical chip may process such that wavemeter system 10 can accurately and precisely determine the wavelength of input optical signal 12. In this way, processing circuitry 20 may select optical chip 38A which is configured for processing optical signals within a range of wavelengths encompassing, substantially encompassing, or overlapping with the range of wavelengths determined in the coarse wavelength unit. In at least some examples where processing circuitry 20 selects optical chip 38A based on the coarse wavelength measurement, processing circuitry 20 may control beam splitter device 36 to direct at least a portion of the second portion of input optical signal 12 to optical chip 38A. Additionally, beam splitter device 36 may refrain from outputting input optical signal 12 to one or more optical chips that are not selected by processing circuitry 20.

In some examples, each optical chip of optical chips 38 may represent a compressive-sensing spatially-heterodyned Fourier-transform spectrometer (CS-SHFTS) waveguide chip. Each optical chip of optical chips 38 may include a set of interferometers that process input optical signal 12 such that detector array 40 may capture samples representing the partial Fourier transform of the optical spectrum of input optical signal 12. In this way, optical chips 38 may be configured to "generate components of the Fourier transform" of the input optical signal. Because a Fourier transform decomposes an optical spectrum into constituent time-samples, wavemeter system 10 may use independently collected time-samples from the optical spectrum to determine the frequency content of the input optical signal. Each interferometer of the set of interferometers included in an optical chip (e.g., optical chip 38A) may be a part of a waveguide corresponding to a specific wavelength value. For example, each interferometer of the set of interferometers included in optical chip 38A may be configured to pass a wavelength component of the respective specific wavelength value while not passing wavelength components including other wavelength values other the specific wavelength value. In some examples, optical chip 38A may include a set of interferometers, each interferometer corresponding to a respective wavelength value. The respective wavelength values of the set of interferometers may represent a range of wavelengths of optical signals that optical chip 38A is configured to process. In some examples, optical chip 38A may include a plurality of sets of interferometers, where each set of interferometers of the plurality of sets of interferometers corresponds to a respective range of wavelengths. Beam splitter device 36 may be configured to direct input optical signal 12 to any one of the plurality of sets of interferometers on optical chip 38A, a combination of two or more of the plurality of sets of interferometers on optical chip 38A, or none of the plurality of sets of interferometers on optical chip 38A.

Wavemeter system 10 may include a compressive-sensing on-chip sensor for precision measurement of optical wavelengths in visible and infrared wavelengths (e.g., a wavemeter) including an array of many (e.g., more than 10, more than 100, more than 1000, etc.) waveguide interferometers or ring resonators outputting a discrete sampling of the Fourier-transform of the optical spectrum of the input optical signal. Detector array 40 may perform the discrete sampling. For example, the Fourier samples of the input spectrum produced by one or more optical chips of the set of optical chips 38 may be captured as optical intensity values by detector array 40 (e.g., at least one of a linear photodiode array, a 2-D detector array, or an on-chip photodetector). Additionally, the samples captured by detector array 40 may be digitized by an electronic circuit including one or more of a low-noise pre-amplifier, amplifier, analog-to-digital converter, or other circuitry. The electronic circuit, in some cases, may be a part of readout electronics 42.

The Fourier samples of an input spectrum produced by an optical chip (e.g., optical chip 38A) of optical chips 38 may be controlled by the optical path length of the waveguide cavities (interferometers, ring resonators) used on the chip; these path lengths may be chosen to be linearly increasing or randomly allocated between an upper and lower bound. A respective interferometer of the set of interferometers may include an optical path delay, where the length of the optical path delay corresponds to a wavelength of an optical signal passing through one or more of optical chips 38. In this way, the optical path delay of an interferometer produces a unique response as a function of wavelength, and is configured to yield a precise Fourier sample according to the respective optical path delay. In some examples, the optical path lengths of the interferometers are used to determine the resolution (e.g., precision) of the respective optical chip, and the spectral range of the respective optical chip (e.g., the range of wavelengths within which a single input wavelength may be unambiguously determined). The greatest optical path length in an optical chip corresponds to the resolution (e.g., precision) of the wavelength measurement, and the shortest optical path length corresponds to the spectral range over which a wavelength measurement may be produced. For example, increasing the optical path length of the longest interferometer of an optical chip may result in a corresponding increase in resolution (e.g., precision) measured by the chip. Similarly, decreasing the optical path length of the shortest interferometer may result in a corresponding increase in the range of wavelengths that may by measured simultaneously by the chip. In some examples, wavemeter system 10 may re-construct the input spectrum (e.g., the optical spectrum of input optical signal 12) from the digitized Fourier samples collected by detector array 40 by performing a discrete Fourier-transform in one or more cases where optical path lengths are linearly increasing across an optical chip. Additionally, in some examples, wavemeter system 10 may re-construct the input spectrum (e.g., the optical spectrum of input optical signal 12) from the digitized Fourier samples collected by detector array 40 by performing a compressive sensing operation in one or more cases where optical path lengths are randomly allocated across an optical chip.

Detector array 40 may, in some examples, include a set of photoreceivers. In general, the set of photoreceivers may each include one or more transistors configured to absorb photons of an optical signal and output, in response to absorbing the photons, generate an electrical signal. In this manner, the set of photoreceivers may be configured to convert optical signals output by optical chips 38 into electrical signals for output to one or both of processing circuitry 20 and readout electronics 42. The set of photoreceivers, for example, may each include a p-n junction that converts photons of an optical signal into an electrical signal. In some examples, one or more frequency values corresponding to the optical signal may be included in the electrical signal produced by the set of photoreceivers in response to the set of photoreceivers receiving the optical signal.

Additionally, in some examples, one or more intensity values corresponding to the optical signal may be included in the electrical signal produced by the set of photoreceivers in response to the set of photoreceivers receiving the optical signal. For example, a photoreceiver of the set of photoreceivers may produce a first electrical signal in response to receiving a first optical signal and the photoreceiver may produce a second electrical signal in response to receiving a second optical signal, where the first electrical signal is stronger than the second electrical signal (e.g., the first electrical signal includes a greater electrical current magnitude) if the first optical signal is stronger than the second optical signal (e.g., the first optical signal includes a greater photon density than the second optical signal). In some cases, the photoreceiver of the set of photoreceivers may produce an electrical signal to include the one or more frequency values corresponding to the received optical signal. The set of photoreceivers of detector array 40 may include semiconductor materials such as any combination of Indium Gallium Arsenide, Silicon, Silicon Carbide, Silicon Nitride, Gallium Nitride, Germanium, or Lead Sulphide.

In some cases, using compressive sensing to reconstruct the input spectrum may be beneficial when the input spectrum is sparse in frequency space (e.g., the input spectrum contains very few frequency components). The wavelength resolution (e.g., precision) of a reconstructed spectrum (e.g., the optical signal) is governed by the length of the longest waveguide cavity, and the range of wavelengths (the bandwidth) permitted by the system is governed by the length of the shortest cavity and the number of sampling points. In some examples, reconstruction of the original spectrum using randomly allocated Fourier samples inverted with compressed sensing may be achieved with fewer than $\frac{1}{4}$ of the Nyquist-limited number of samples for linearly-allocated path delays inverted using the discrete Fourier-transform. In some examples, reconstruction of the original spectrum using randomly allocated Fourier samples inverted with compressed sensing may be achieved with fewer than $\frac{1}{5}$ of the Nyquist-limited number of samples for linearly-allocated path delays inverted using the discrete Fourier-transform. In some examples, reconstruction of the original spectrum using randomly allocated Fourier samples inverted with compressed sensing may be achieved with fewer than $\frac{1}{10}$ of the Nyquist-limited number of samples for linearly-allocated path delays inverted using the discrete Fourier-transform. Additionally, by using randomly allocated Fourier samples inverted via compressive sensing, an on-chip footprint may be substantially reduced compared to systems including linearly arrayed optical path delays, the number of photodetectors and related amplification and readout circuitry may also be substantially reduced.

Fourier samples captured by detector array 40 may be stored in an internal flash memory device (e.g., memory 22), for later inversion, or may be inverted immediately and stored as spectra or output directly to the user (e.g., outputted via communication circuitry 24) for feedback during experiment. In some examples, wavemeter system 10 may be fabricated using planar waveguides of a high-index material (e.g. silicon, silicon nitride, indium phosphide etc.) deposited on a lower-index material (e.g. silicon dioxide) and protected by a lower index upper layer (e.g. silicon dioxide). The integrated optical chip making up the interferometric heart of the system is fabricated in mass quantities at wafer-scale to reduce unit cost. Light may be coupled into optical chips 38 via one or more optical fibers that are butt-coupled to optical chips 38 and may be passively aligned to the waveguide by a v-groove array. Light may be routed to individual waveguides on a respective optical chip of optical chips 38 by splitting a single access waveguide multiple times using a branching tree of waveguide splitters (e.g. directional couplers, y-splitters, multi-mode interference devices). Wavemeter system 10 may include a plurality of optical chips 38, each addressing a different optical waveband, which may be activated or deactivated via remote verification of a software license key held by a user.

In some examples, each optical chip of optical chips 38 may include the same number interferometers. Detector array 40, in some cases, may include a number of photoreceivers that is the same as the number interferometers included in each optical chip of optical chips 38. Each interferometer of the set of interferometers may correspond to a waveguide including an optical path length that corresponds to a particular photoreceiver of detector array 40. As such, when beam splitter device 36 directs at least a portion of input optical signal 12 to an optical chip (e.g., optical chip 38A) of optical chips 38, each photoreceiver of detector array 40 may capture a Fourier sample that corresponds to input optical signal 12. Each photoreceiver of detector array 40 corresponds to a respective interferometers of optical chip 38A. As such, detector array 40 may capture a set of Fourier samples, each Fourier sample of the set of Fourier samples corresponding to a respective interferometer of the set of interferometers of optical chip 38A. Each interferometer of the set of interferometers may be configured to pass a particular wavelength. In this way, a Fourier sample captured by a photoreceiver of detector array 40 includes an intensity value, where the intensity value corresponds to an amount of input optical signal 12 that contains a wavelength component that is passed by the interferometers corresponding to the photoreceiver.

In some examples, memory 22 is configured to store a set of calibration matrices, where each calibration matrix of the set of calibration matrices corresponds to a chip temperature value. Each time that processing circuitry 20 calculates the optical spectrum of input optical signal 12, processing circuitry 20 may determine, using temperature sensor(s) 44, a temperature of optical chips 38. For example, processing circuitry 20 may select a calibration matrix of the set of calibration matrices that is assigned a temperature range that includes a current temperature detected at optical chips 38. Additionally, in some examples, processing circuitry 20 of wavemeter system 10 is configured to determine whether a signal to noise ratio (SNR) corresponding to the partial interferogram captured by detector array 40 is below an SNR threshold. If the SNR is below the SNR threshold, the processing circuitry 20 is configured to adjust an exposure time of detector array 40 and capture, using detector array 40, another partial interferogram using the at least the portion of input optical signal 12.

Figure 2:
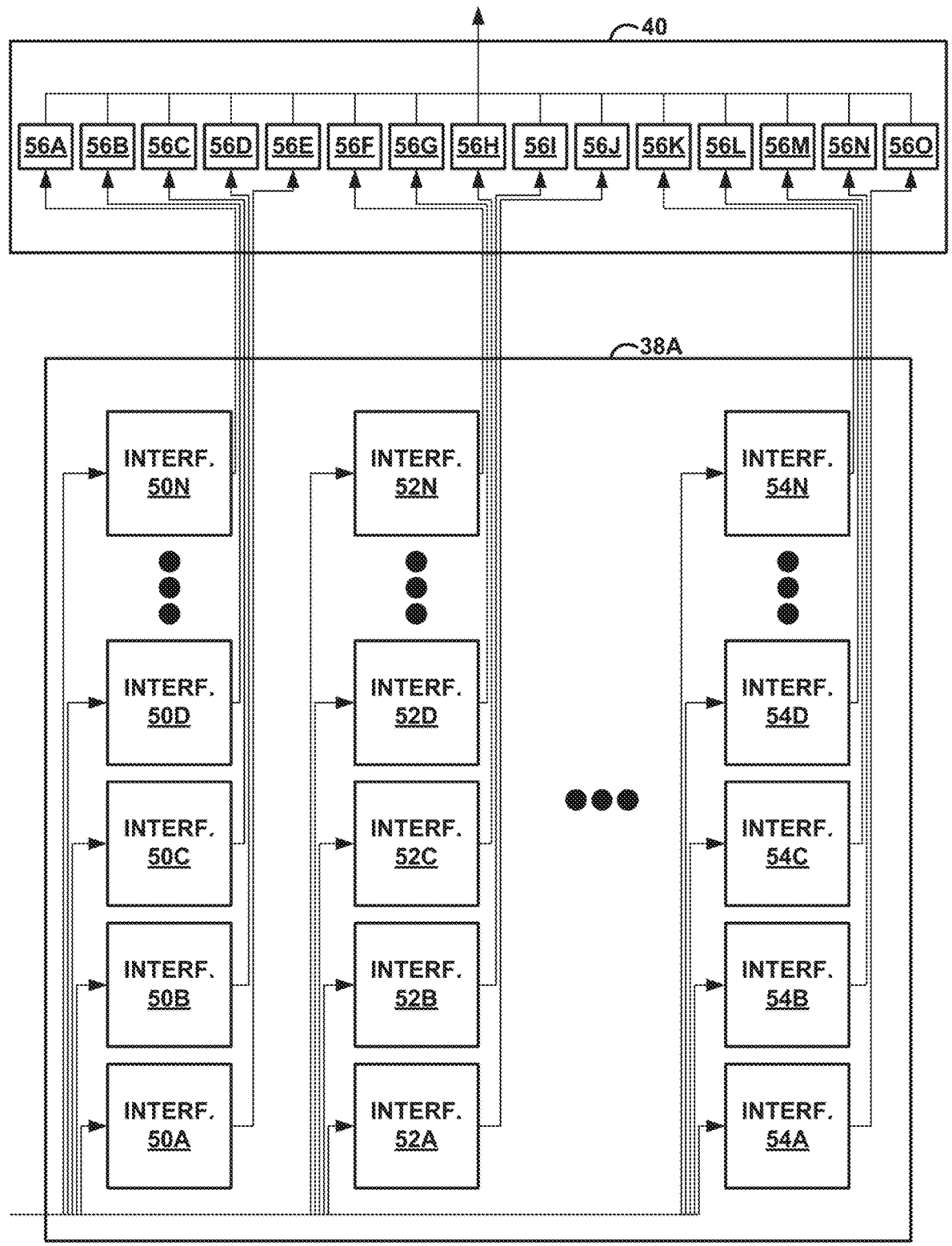
FIG. 2 is a block diagram illustrating an optical chip and a detector array, in accordance with one or more techniques of this disclosure.

FIG. 2 is a block diagram illustrating optical chip 38A and detector array 40, in accordance with one or more techniques of this disclosure. As seen in FIG. 2, optical chip 38A includes interferometers 50A-50N (collectively, "interferometers 50"), interferometers 52A-52N (collectively, "interferometers 52"), and interferometers 54A-54N (collectively, "interferometers 54"). Collectively, interferometers 50, interferometers 52, and interferometers 54 may be referred to herein as "set of interferometers 50, 52, 54" Additionally, detector array 40 includes photoreceivers 56A-56O (collectively, "photoreceivers 56").

As used herein, optical chip may refer to a set of waveguides and a respective set of interferometers. In some examples, a single physical object may include more than one set of waveguides and thus include more than one optical chip. However, in the example illustrated in FIG. 2, optical chip 38A represents both a single object and a single optical chip.

In some examples, beam splitter device 36 of FIG. 1 may direct at least a portion of input optical signal 12 to optical chip 38A. Optical chip 38A may include a set of interferometers 50, 52, 54. In some cases, each interferometer of the set of interferometers 50, 52, 54 is a part of an optical waveguide that is configured to carry optical signals. Each respective optical waveguide corresponding to the set of interferometers 50, 52, 54 may have an optical path length. The optical path length of a waveguide may represent a total length that a photon must travel in order to pass through the waveguide. In some examples, each interferometer of the set of interferometers 50, 52, 54 may be a part of a respective waveguide including a different (e.g., higher or lower) optical path length than waveguides corresponding to other interferometers of the set of interferometers 50, 52, 54. The optical path length of a waveguide may determine a wavelength or range of wavelengths that the waveguide is configured to carry such that a respective photoreceiver of photoreceivers 56 obtains a Fourier sample that yields an accurate wavelength of input optical signal 12.

Each interferometer of the set of interferometers 50, 52, 54 may be optically coupled to a respective photoreceiver of photoreceivers 56. As shown in the example of FIG. 2, interferometer 50A is coupled to photoreceiver 56E, interferometer 50B is coupled to photoreceiver 56D, and interferometer 54A is coupled to photoreceiver 56O, as examples. In this way, photoreceivers 56 may be configured to independently detect photons passing through each interferometer of the set of interferometers 50, 52, 54. Each interferometer of the set of interferometers 50, 52, 54 may be configured to pass photons within a specific band of wavelengths. As such, photoreceivers 56 may be configured to measure a wavelength content of the input optical signal (e.g., input optical signal 12) delivered to optical chip 38A. For example, each photoreceiver of photoreceivers 56 may be configured to perform an intensity measurement (e.g., measure a number of photons arriving at the respective photoreceiver in a period of time).

In some cases, an intensity value produced by an intensity measurement is correlated with a strength value of a respective wavelength component of input optical signal 12. For example, a first intensity measurement performed by a photoreceiver (e.g., photoreceiver 56B) that produces a first intensity value may indicate that a first wavelength component of input optical signal 12 corresponds to a first strength value for its associated interferometer. Additionally, a second intensity measurement performed by a photoreceiver (e.g., photoreceiver 56C) that produces a second intensity value may indicate that that same wavelength component of input optical signal 12 corresponds to a second strength value for the associated interferometer. In at least some examples where the second intensity value is lower than the first intensity value, the second strength value may be lower than the first strength value, thus indicating that the wavelength component is more prevalent passing through the first interferometer than the second interferometer.

Wavelength is inversely proportional to frequency. As such, by determining a "wavelength content" of input optical signal 12, wavemeter system 10 may also determine a "frequency content" of input optical signal 12 based on the wavelength content of input optical signal 12. For example, wavemeter system 10 may calculate the frequency content of input optical signal 12 using the wavelength content of input optical signal 12 and the velocity of the optical wave through wavemeter system 10 (e.g., the speed of light).

In this way, optical chip 38A including the set of interferometers 50, 52, 54 may perform a discrete Fourier transform of input optical signal 12 by producing the time content of input optical signal 12 based on the wavelength content of input optical signal 12. The intensity values generated by photoreceivers 56 may be referred to herein as "Fourier samples." Processing circuitry 20 (illustrated in FIG. 1) may use the intensity values generated by photoreceivers 56 in order to determine an optical spectrum of input optical signal 12.

In some examples, the respective optical path lengths of the waveguides that include the set of interferometers 50, 52, 54 may linearly increase from interferometer 50A to interferometer 54N. In some examples, the respective optical path lengths of the waveguides that include the set of interferometers 50, 52, 54 are configured to linearly decrease from interferometer 50A to interferometer 54N. In some examples, the respective optical path lengths of the waveguides connected to the set of interferometers 50, 52, 54 range between an upper bound and a lower bound and are randomly selected from a set of linearly increasing or linearly decreasing optical path lengths. The upper bound and the lower bound of the optical path lengths of the set of interferometers 50, 52, 54 may represent boundaries of the wavelength band that the set of interferometers 50, 52, 54 are configured to measure.

Processing circuitry 20 may perform a discrete Fourier transform on the Fourier samples captured by photoreceivers 56 in order to determine an optical spectrum of input optical signal 12. In some examples, the respective optical path lengths of waveguides including the set of interferometers 50, 52, 54 linearly increase or linearly decrease on optical chip 38A. Additionally, in some examples, processing circuitry 20 may use compressive sensing to determine the optical spectrum of input optical signal 12. For example, the respective optical path lengths of waveguides including the set of interferometers 50, 52, 54 may range between an upper bound and a lower bound and may be randomly selected from a set of linearly increasing or linearly decreasing optical path lengths. As such, photoreceivers 56, which are coupled to the waveguides, may capture a partial interferogram. Using the Fourier samples (e.g., the partial interferogram) captured by photoreceivers 56 and a calibration matrix, processing circuitry 20 may solve for the optical spectrum of input optical signal 12.

Although FIG. 2 illustrates the set of interferometers 50, 52, 54 as being part of optical chip 38A, each of optical chips 38A-38N may, in some cases, include another respective set of interferometers. In some examples, the set of interferometers included by each of optical chips 38A-38N may be connected to photoreceivers 56. Additionally, in some examples, each set of interferometers included by optical chips 38A-38N may include the same number of interferometers.

Figure 3:
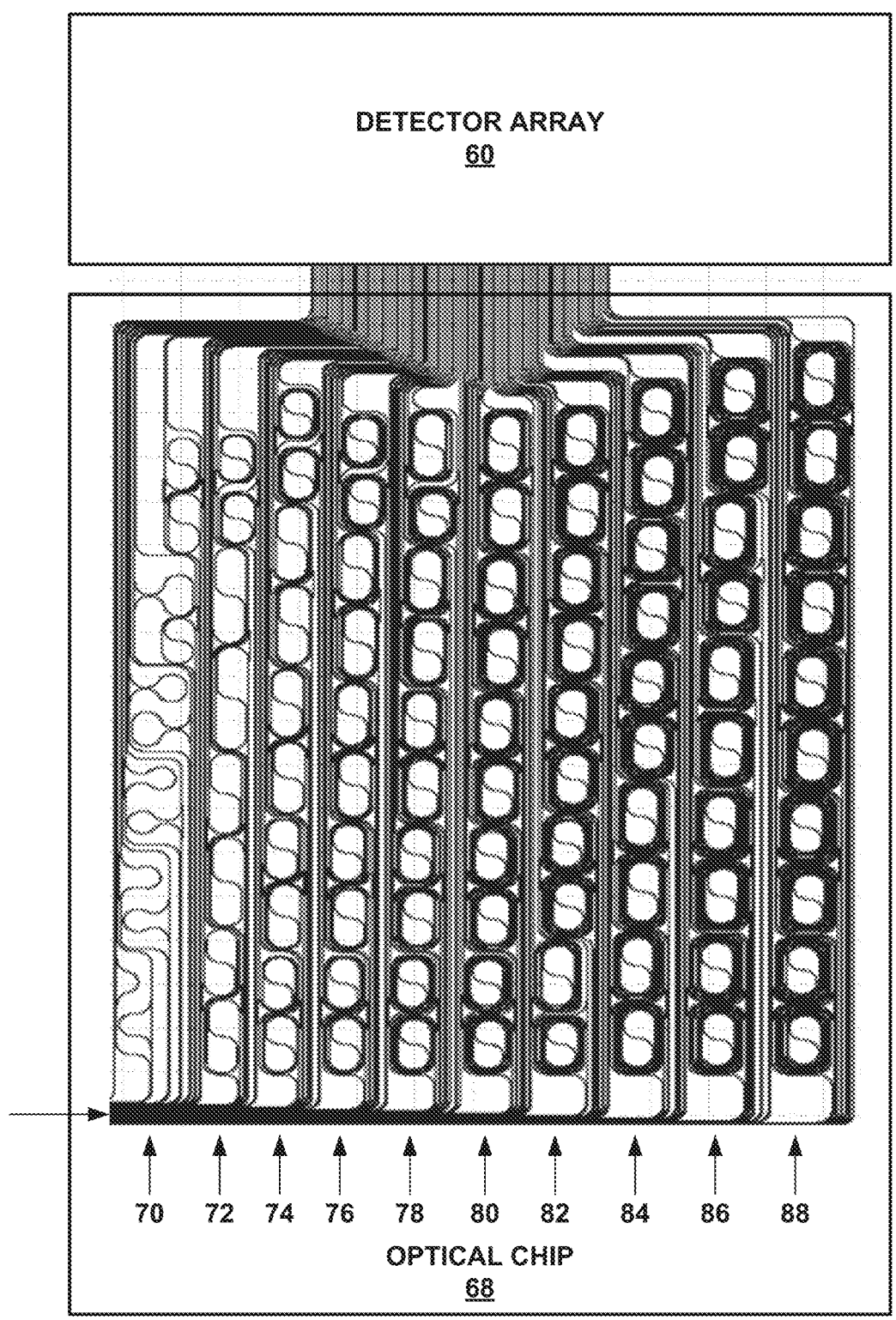
FIG. 3 is a schematic diagram illustrating an example of the optical chip and the detector array of FIG. 2, in accordance with one or more techniques of this disclosure.

FIG. 3 is a schematic diagram illustrating an example of the optical chip and the detector array of FIG. 2, in accordance with one or more techniques of this disclosure. FIG. 3 includes detector array 60 and optical chip 68. Optical chip 68 includes interferometers 70, 72, 74, 76, 78, 80, 82, 84, 86, and 88. In some examples, detector array 60 is an example of detector array 40 of FIG. 1. In some examples, optical chip 68 is an example of any of optical chips 38A-38N of FIG. 1. Additionally, in some examples, interferometers 70, 72, 74, 76, 78, 80, 82, 84, 86, and 88 are an example of the set of interferometers 50, 52, 54 of FIG. 2. As illustrated in FIG. 3, waveguides including interferometers 70, 72, 74, 76, 78, 80, 82, 84, 86, and 88 have increasing path lengths from interferometers 70 to interferometers 88 (e.g., interferometers are "wider" due to more wraps of the optical waveguide). In some examples, an optical signal arrives at optical chip 68, passes through interferometers 70, 72, 74, 76, 78, 80, 82, 84, 86, and 88, and arrives at detector array 60. The respective optical path length of each waveguide of optical chip 68 may define a spectral response to optical signals that optical chip 68 may carry to yield a precise measurement of input optical signal 12.

Figure 4:
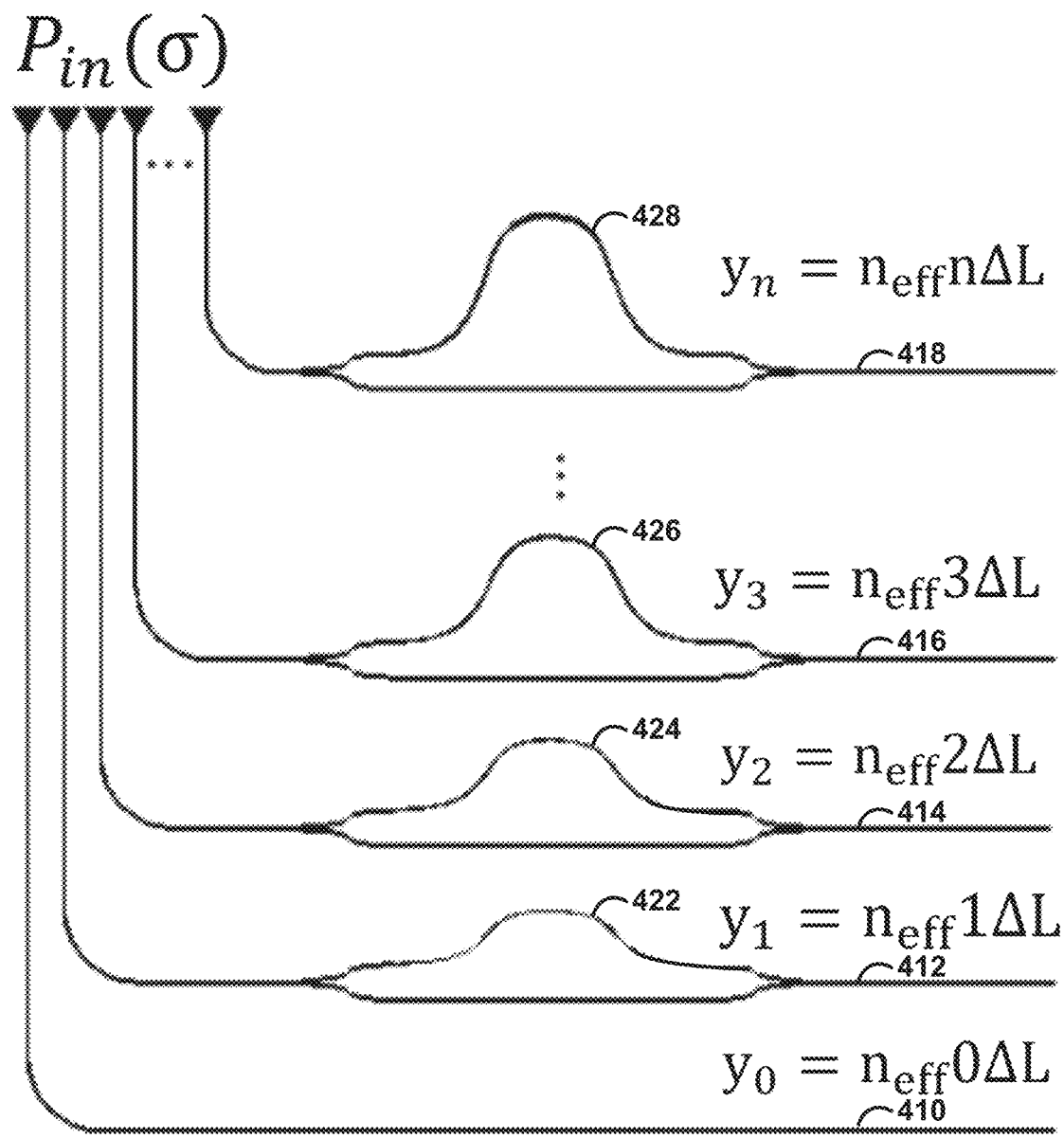
FIG. 4 is a conceptual diagram illustrating a set of waveguides and a full set of interferometers, in accordance with one or more techniques of this disclosure.

FIG. 4 is a conceptual diagram illustrating a set of waveguides 410, 412, 414, 416, and 418 and a full set of interferometers 422, 424, 426, 428, and 430, in accordance with one or more techniques of this disclosure. As shown in FIG. 4, at least some of a set of waveguides 410, 412, 414, 416, and 418 each include one of the full set of interferometers 422, 424, 426, 428, and 430. For example, waveguide 412 includes interferometer 422, waveguide 414 includes waveguide 414, waveguide 416 includes interferometer 426, and waveguide 418 includes interferometer 428. Waveguides 410, 412, 414, 416, and 418 have optical path lengths in linearly increasing multiples of a common physical path increment $\Delta L$; the optical path length increments are given by $y_0 = n_{eff} 0 \Delta L$ for waveguide 410, $y_1 = n_{eff} 1 \Delta L$ for waveguide 412, $y_2 = n_{eff} 2 \Delta L$ for waveguide 414, $y_3 = n_{eff} 3 \Delta L$ for waveguide 416, and $y_n = n_{eff} n \Delta L$ for waveguide 418, respectively. In this way, the optical path length of the set of waveguides 410, 412, 414, 416, and 418 changes by a factor of $\Delta L$ between each pair of consecutive waveguides of the set of waveguides 410, 412, 414, 416, and 418. In some cases, a set of detectors may collect an "interferogram" which includes a Fourier sample corresponding to each waveguide of the set of waveguides 410, 412, 414, 416, and 418.

Figure 5:
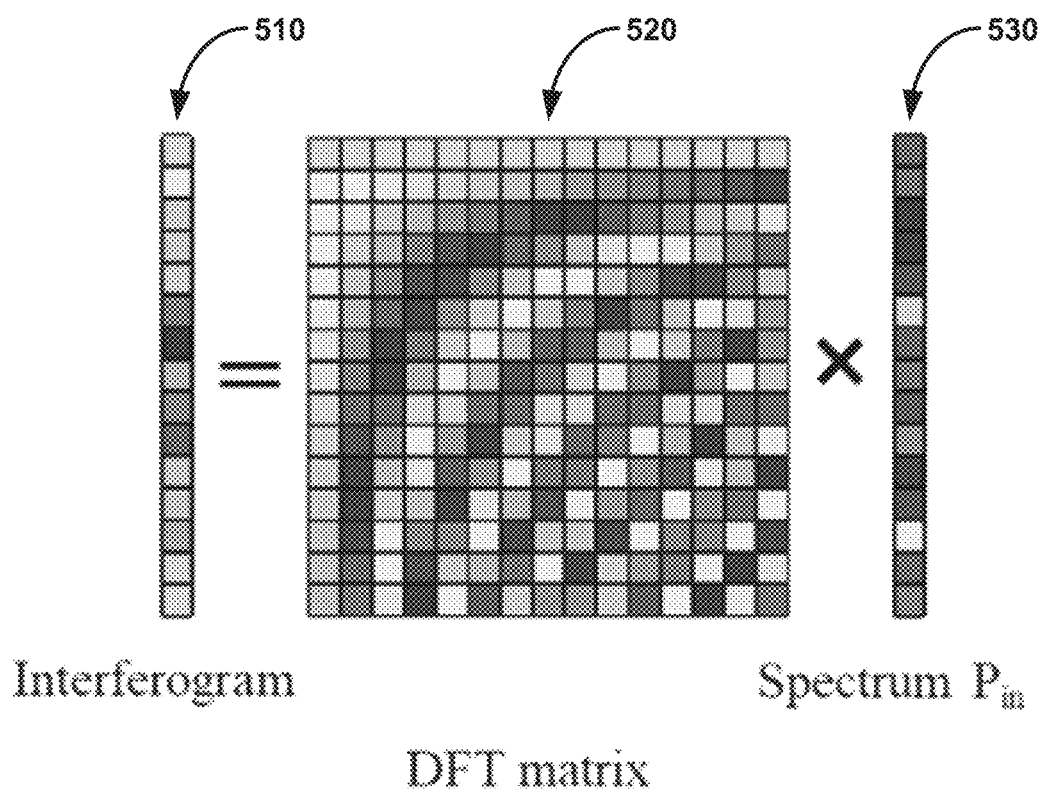
FIG. 5 is a conceptual diagram illustrating an interferogram, a Discrete Fourier Transform (DFT) matrix, and an optical spectrum, in accordance with one or more techniques of this disclosure.

FIG. 5 is a conceptual diagram illustrating interferogram 510, Discrete Fourier Transform (DFT) matrix 520, and optical spectrum 530, in accordance with one or more techniques of this disclosure. In some examples, a set of detectors may collect interferogram 510, where interferogram 510 corresponds to a set of Fourier samples, each Fourier sample of the set of Fourier samples corresponding to a respective interferometer of the set of interferometers 422, 424, 426, 428, and 430 of FIG. 4. During a calibration of wavemeter system 10, processing circuitry (e.g., processing circuitry 20 and/or other processing circuitry) may calculate DFT matrix 520 based on interferogram 510 and known optical spectrum 530. For example, during the calibration of wavemeter system 10, optical spectrum 530 may be measured, where optical spectrum 530 includes a set of optical spectrum samples including a same size as the set of Fourier samples in the interferogram 510. In some examples, a set of DFT matrices are determined for a range of temperatures.

Figure 6:
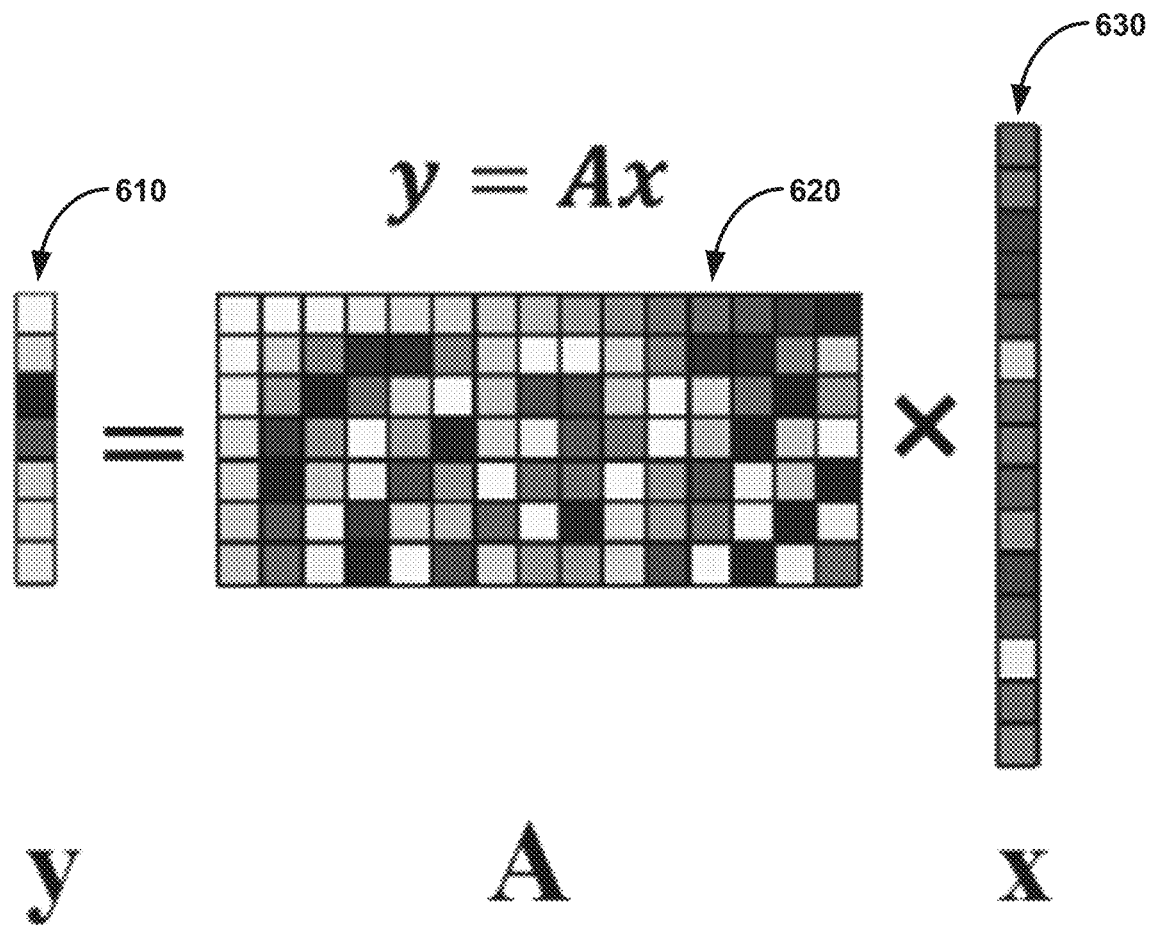
FIG. 6 is a conceptual diagram illustrating a partial interferogram, a calibration matrix, and an optical spectrum, in accordance with one or more techniques of this disclosure.

FIG. 6 is a conceptual diagram illustrating partial interferogram 610, calibration matrix 620, and optical spectrum 630, in accordance with one or more techniques of this disclosure. Each row of calibration matrix 620 may, in some cases, correspond to a respective interferometer selected from the set of interferometers 422, 424, 426, 428, and 430 of FIG. 4. As such, detector array 40 may collect partial interferogram 610 which includes a Fourier sample corresponding to each interferometer of a selected subset of interferometer of the set of interferometers 422, 424, 426, 428, and 430. For example, the selected subset of interferometers of the set of interferometers 422, 424, 426, 428, and 430 may be represented by interferometers 722, 724, and 728 of FIG. 7. Based on partial interferogram 610 and calibration matrix 620, processing circuitry 20 may determine a complete optical spectrum 630 of input optical signal 12. For example, processing circuitry 20 may calculate optical spectrum 630 using a compressive sensing l1-norm retrieval operation, where the compressive sensing retrieval operation represents the solution to a matrix algebra operation with fewer equations than unknowns. In some examples, processing circuitry 20 may complete the compressive sensing retrieval operation using $l_1$-norm minimization. By using compressive sensing to determine optical spectrum 630, a number of waveguides and interferometers included in optical chips 38 may be decreased, thus decreasing a size of optical chips 38 and improving an efficiency of wavemeter system 10. As seen in FIG. 6, a number of Fourier samples included in partial interferogram 610 may be smaller than a number of optical spectrum samples included in optical spectrum 630. In some examples, calibration matrix 620 may be stored in a memory of wavemeter system 10. Wavemeter system 10 may use partial interferogram 610 and calibration matrix 620 to determine optical spectrum 630.

The set of Fourier samples captured by detector array 40 may be referred to herein as a "partial interferogram." In some cases, the partial interferogram may be represented as a one-column matrix containing each Fourier sample of the set of Fourier samples captured by detector array 40. In some examples, processing circuitry 20 may be configured to calculate an optical spectrum of input optical signal 12 by solving the following sensing equation.

$$y=Ax \qquad \text{(equation 1)}$$

In equation 1, 'y' represents the partial interferogram, 'x' represents the optical spectrum of input optical signal 12, and 'A' represents a calibration matrix. The calibration matrix A may include constant values and may be determined during a calibration of wavemeter system 10. In some examples, processing circuitry 20 is configured to solve for the optical spectrum 'x' by executing a compressive sensing retrieval operation (e.g., solving for 'x' based on equation 1), because 'y' and 'A' are known, and 'x' is unknown. In some examples, wavemeter system 10 is configured to execute the compressive sensing retrieval operation using $l_1$-norm minimization.

The reduced number of samples allowed by the compressive sensing retrieval may cause wavemeter system 10 to reach a large optical bandwidth and high spectral resolution with a reduced number of readout pixels as compared with competing free-space optical devices such as Fizeau interferometers and spatial heterodyne interferometers. For example, Fizeau interferometers and spatial heterodyne interferometers may capture full interferograms rather than partial interferograms. In some examples, wavemeter system 10 is calibrated (e.g., once), during manufacturing, by a well-characterized tunable laser collecting a "calibration map" or "matrix" of waveguide outputs as a function of wavelength which is then used for the retrieval of spectra from collected Fourier samples. In some examples, wavemeter system 10 achieves even greater optical bandwidth by combining a plurality of optical chips, each addressing a different wavelength range, into a single system with optical readout performed using on-chip photodetectors (e.g., photoreceivers), or a 2-D array. Compressive sensing retrievals of the input spectrum may be performed by finding a solution by solving the equation y=Ax using $l_1$-norm minimization, where y is the instrument output, A the calibration matrix, and x is the spectrum of interest.

Figure 7:
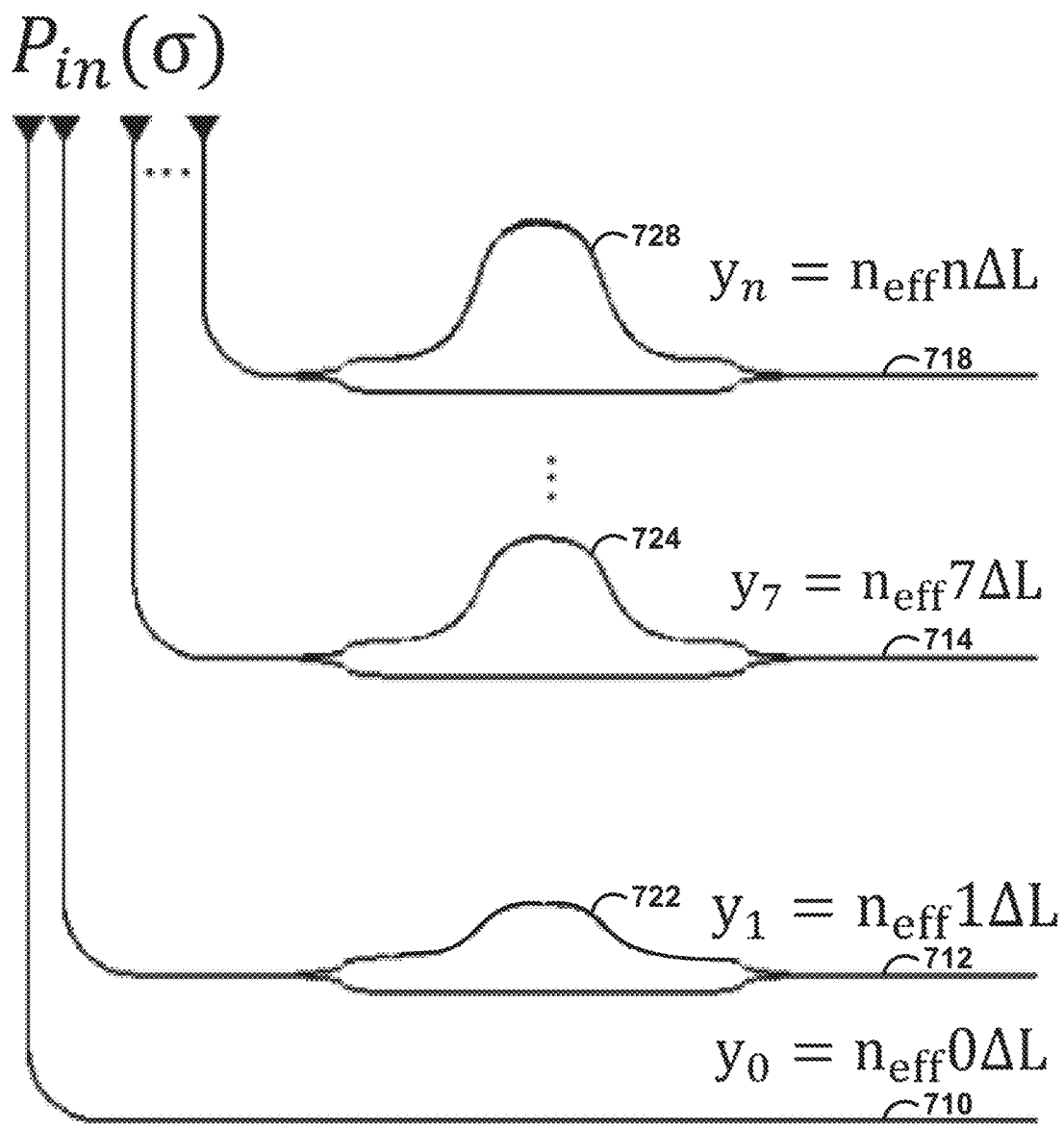
FIG. 7 is a conceptual diagram illustrating a set of waveguides and a partial set of interferometers, in accordance with one or more techniques of this disclosure.

FIG. 7 is a conceptual diagram illustrating a set of waveguides 710, 712, 714 and 718 and a partial set of interferometers 722, 724, and 728 in accordance with one or more techniques of this disclosure. As shown in FIG. 7, at least some of a set of waveguides 710, 712, 714 and 718 each include one of the partial set of interferometers 722, 724, and 728. For example, waveguide 712 includes interferometer 722, waveguide 714 includes waveguide 724, and waveguide 718 includes interferometer 728. In some examples, waveguide 710 is an example of waveguide 410 of FIG. 4, waveguide 712 is an example of waveguide 412 of FIG. 4, and waveguide 718 is an example of waveguide 418 of FIG. 4. The set of waveguides 710, 712, 714 and 718 and respective interferometers 722, 724, and 728 may, in some examples, be randomly selected to correspond to the rows of calibration matrix 620 of FIG. 6. In this way, a number of waveguides and a number of interferometers included in each optical chip of optical chips 38 may be decreased. For example, each optical chip of optical chips 38 is formed from an array of interferometers (e.g., Mach-Zehnder interferometers (MZIs)) by selecting a random subset of interferometers to form a partial DFT matrix.

Figure 8:
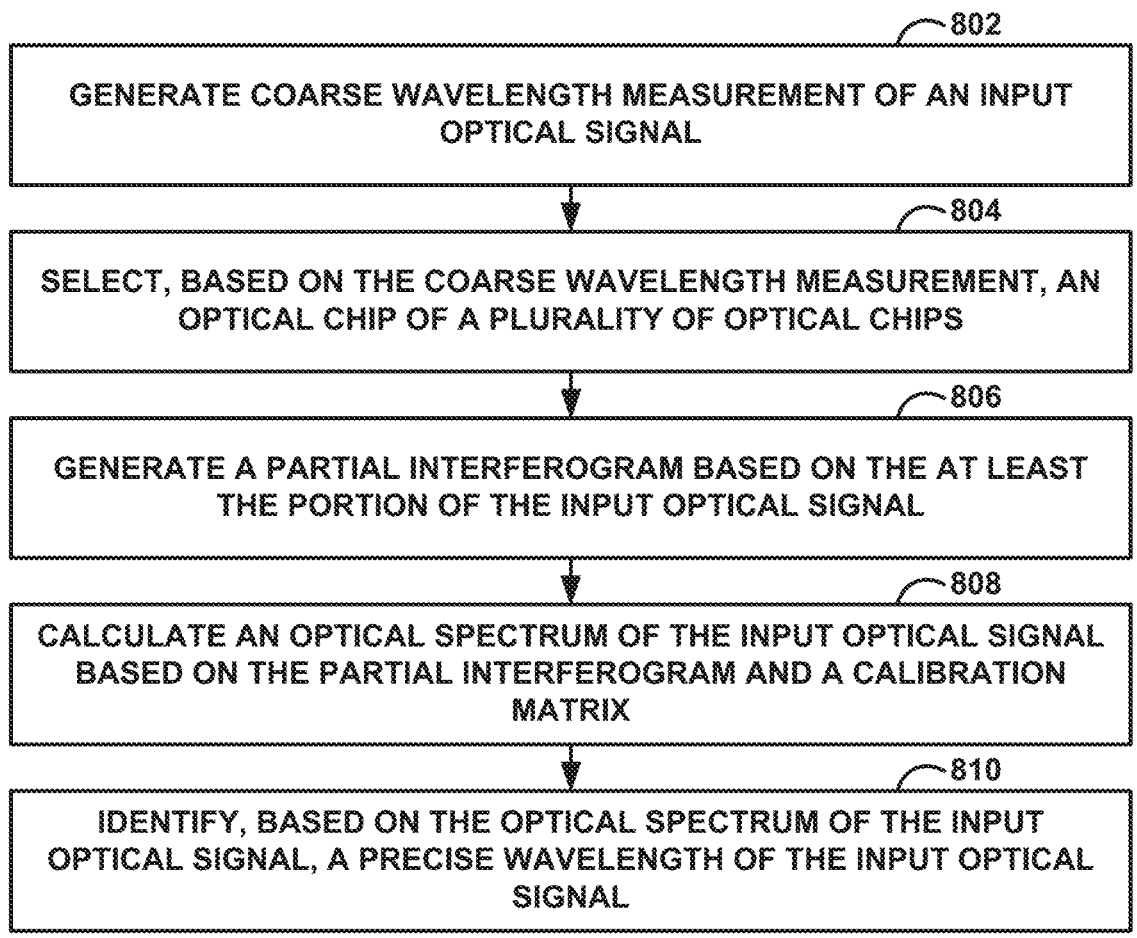
FIG. 8 is a flow diagram illustrating a first example operation for identifying a wavelength of an optical signal, in accordance with one or more techniques of this disclosure.

FIG. 8 is a flow diagram illustrating a first example operation for identifying a wavelength of an optical signal, in accordance with one or more techniques of this disclosure. For convenience, FIG. 8 is described with respect to wavemeter system 10 of FIG. 1 for example purposes only. However, the techniques of FIG. 8 may be performed by different components of wavemeter system 10 or by additional or alternative devices.

In some examples, wavemeter system 10 represents a system that is configured to accurately and efficiently measure a wavelength of an optical signal, such as input optical signal 12. Wavemeter system 10 may receive input optical signal 12 via a waveguide and tap device 32 may split input optical signal 12 into a first portion that is outputted to coarse wavelength unit 34 and a second portion that is sent to beam splitter device 36. Coarse wavelength unit 34 may generate a course wavelength measurement of the first portion of input optical signal 12 (802). The coarse wavelength measurement, in some examples, may represent a "rough estimation" of the wavelength of input optical signal 12 that processing circuitry 20 may use to identify the wavelength of input optical signal 12 as being somewhere within a range of wavelengths. While the coarse wavelength measurement performed by coarse wavelength unit 34 may not produce as accurate of a wavelength measurement as a final wavelength value measured by wavemeter system 10, the coarse wavelength measurement may be used by processing circuitry 20 to further process input optical signal 12 in order to calculate a precise wavelength of input optical signal 12. In some examples, to perform the coarse wavelength measurement, coarse wavelength unit 34 is configured to generate the coarse wavelength measurement using AWG. In some examples, to perform the coarse wavelength measurement, coarse wavelength unit 34 is configured to generate the coarse wavelength measurement using Echelle grating.

In the example of FIG. 8, processing circuitry 20 may select, based on the coarse wavelength measurement, an optical chip from optical chips 38 (804). For example, each optical chip of optical chips 38 may be configured to carry, or pass, optical signals including wavelengths within a band of wavelengths. For instance, processing circuitry 20 may select an optical chip from optical chips 38 configured to carry optical signals including the coarse wavelength measurement. In this way, processing circuitry 20 may select a respective optical chip from optical chips 38 (e.g., optical chip 38A) that is configured to carry input optical signal 12, based on the wavelength value produced by the coarse wavelength measurement.

Detector array 40 may generate a partial interferogram based on the at least the portion of input optical signal 12 (806) directed to optical chip 38A. For example, detector array 40 may generate the partial interferogram using an output from optical chip 38A. The partial interferogram, in some cases, may include a set of Fourier samples that represent the Fourier transform of an optical spectrum of input optical signal 12. For example, optical chip 38A may include a set of waveguides that each include an interferometer of a set of interferometers. Each waveguide may have a respective optical path length which determines that optical signals including a certain band of wavelengths can pass through the waveguide. Each waveguide of the set of waveguides may be coupled to a photoreceiver of detector array 40. In this way, each respective waveguide may produce a Fourier sample at a photoreceiver of detector array 40 during a wavelength measurement performed by wavemeter system 10. Processing circuitry 20 may calculate an optical spectrum of input optical signal 12 based on the partial interferogram and a calibration matrix (808). In some examples, the calibration matrix is determined during a calibration of wavemeter system 10. The calibration matrix may correspond to a particular temperature of optical chip 38A. In other words, processing circuitry 20 may select a calibration matrix based on the temperature of optical chip 38A. In some examples, processing circuitry 20 may calculate the optical spectrum using a compressive sensing retrieval operation. Processing circuitry 20 may identify, based on the optical spectrum of input optical signal 12, the precise wavelength of input optical signal 12 (810).

Figure 9:
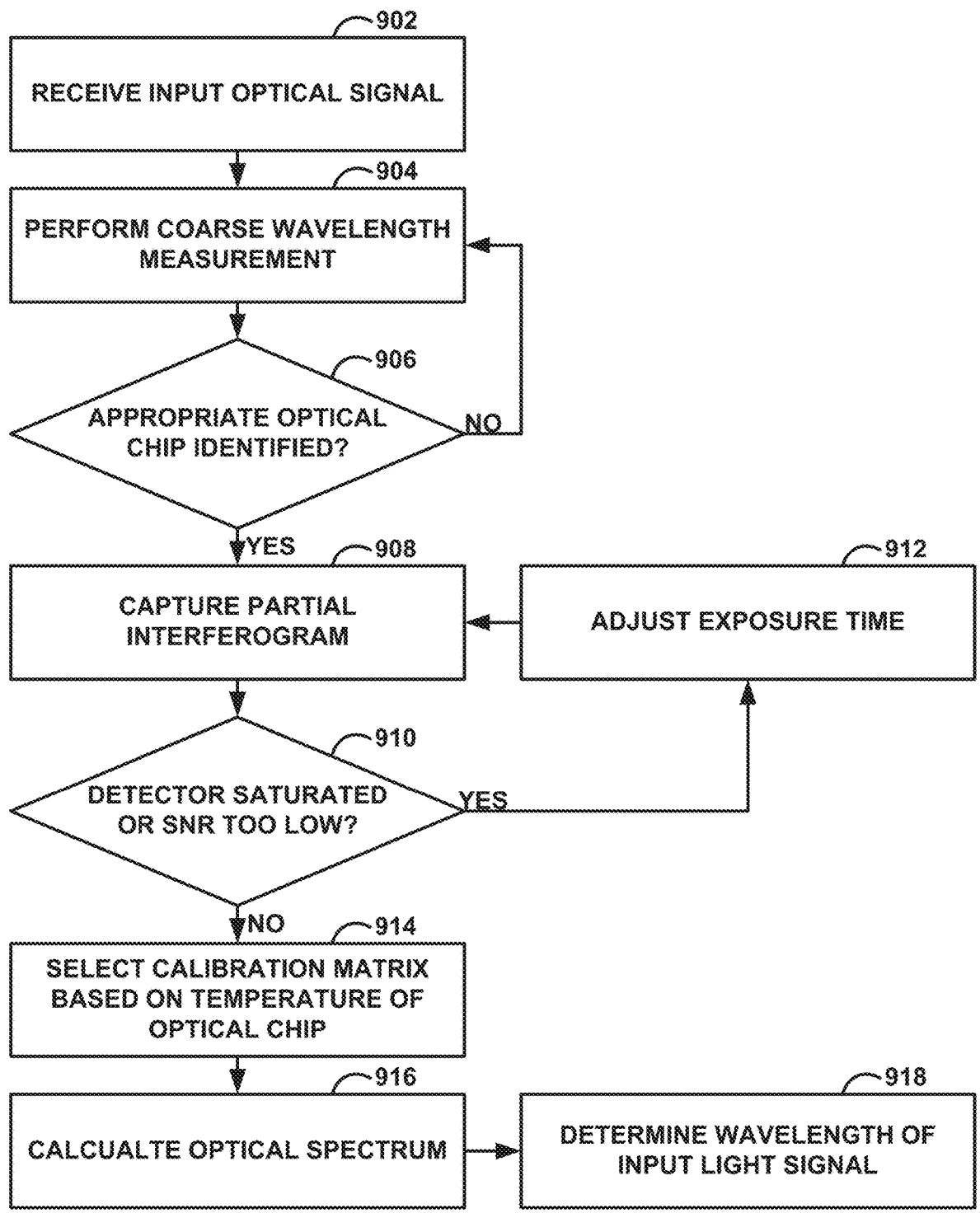
FIG. 9 is a flow diagram illustrating a second example operation for identifying a wavelength of an optical signal, in accordance with one or more techniques of this disclosure.

FIG. 9 is a flow diagram illustrating a second example operation for identifying a wavelength of an optical signal, in accordance with one or more techniques of this disclosure. For example purposes only, FIG. 9 is described with respect to wavemeter system 10 of FIG. 1. However, the techniques of FIG. 9 may be performed by different components of wavemeter system 10 or by additional or alternative devices.

In some examples, wavemeter system 10 may represent a system that is configured to accurately and efficiently measure a wavelength of an optical signal, such as input optical signal 12. For example, wavemeter system 10 may receive input optical signal 12 (902). In some cases, tap device 32 may direct a first portion of input optical signal 12 to coarse wavelength unit 34 and tap device 32 may direct a second portion of input optical signal 12 to beam splitter device 36. Coarse wavelength unit 34 may perform a coarse wavelength measurement (904) to generate a wavelength value that represents a wavelength of input optical signal 12. Subsequently, processing circuitry 20 may select an optical chip from optical chips 38 corresponding to the wavelength value produced by the coarse wavelength measurement. For instance, processing circuitry 20 may select an optical chip from optical chips 38 that configured to process a range of wavelengths that includes the wavelength value produced by the coarse wavelength measurement.

Processing circuitry 20 may determine whether the appropriate optical chip is identified (906). For example, processing circuitry 20 may determine whether the identified optical chip is configured to process input optical signal 12 such that detector array 40 may capture a partial interferogram which yields an accurate wavelength measurement of input optical signal 12. If the appropriate optical chip is not identified ("NO" branch of block 906), the example operation may return to block 904 and coarse wavelength unit 34 may perform another coarse wavelength measurement. If the appropriate optical chip is identified ("YES" branch of block 906), detector array 40 may capture a partial interferogram (908) of input optical signal 12. In some examples, the captured partial interferogram may be stored in memory 22.

At block 910, processing circuitry 20 may determine whether detector array 40 is saturated or whether a signal-to-noise ratio (SNR) of the partial interferogram is too low. For example, processing circuitry 20 may determine that detector array 40 is saturated if an intensity measurement of one or more photoreceivers of detector array 40 is greater than an intensity threshold value. Additionally, or alternatively, processing circuitry 20 may determine that an SNR of the partial interferogram is too low if the SNR of the partial interferogram is lower than an SNR threshold value. If detector array 40 is saturated or if the SNR of the partial interferogram is too low ("YES" branch of block 910), processing circuitry 20 may adjust an exposure time of detector array 40 (912) and the example operation returns to block 908. In some cases, processing circuitry 20 may decrease the exposure time in response to detector array 40 being saturated and/or the SNR being too low. In some cases, processing circuitry 20 increases the exposure time in response to detector array 40 not being saturated. If detector array 40 is not saturated and if the SNR of the partial interferogram is not too low ("NO" branch of block 910), processing circuitry 20 may select a calibration matrix (914) based on a temperature of the optical chip selected using the coarse wavelength measurement. Subsequently, processing circuitry 20 may calculate an optical spectrum (916) based on the partial interferogram and the calibration matrix. Processing circuitry 20 may determine the wavelength of input optical signal 12 (918) based on the optical spectrum.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random access memory (RAM), read only memory (ROM), electrically erasable and programmable memories (EEPROM), compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not, however, include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Cloud technology used to automatically save the images on web server is not limited to local or global internet cloud. A cloud can be a private and/or public cloud which is protected by the user ID and passwords. The passwords may not limit to one or two.

What is claimed is:

1. A wavemeter system comprising:
    processing circuitry in communication with a memory configured to store a calibration matrix;
    a detector array;
    a plurality of optical chips; and
    a coarse wavelength unit configured to generate a coarse wavelength measurement of the input optical signal, wherein the processing circuitry is configured to:
        select an optical chip from the plurality of optical chips, the optical chip corresponding to a range of wavelengths identified in the coarse wavelength measurement, wherein the detector array is configured to:
        generate a partial interferogram based on the at least the portion of the input optical signal, and wherein the processing circuitry is further configured to:
        calculate an optical spectrum of the input optical signal based on the partial interferogram corresponding to the at least the portion of the input optical signal and the calibration matrix; and
        identify, based on the optical spectrum of the input optical signal, the precise wavelength of the input optical signal.

2. The wavemeter system of claim 1, wherein to generate the coarse wavelength measurement, the coarse wavelength unit is configured to generate the coarse wavelength measurement using arrayed waveguide grating (AWG).

3. The wavemeter system of claim 1, wherein to generate the coarse wavelength measurement, the coarse wavelength unit is configured to generate the coarse wavelength measurement using Echelle grating.

4. The wavemeter system of claim 1, wherein to select the optical chip from the plurality of optical chips corresponding to the range of wavelengths identified in the coarse wavelength measurement, the processing circuitry is configured to:
    select the optical chip from the plurality of optical chips based on the optical chip being configured to process an optical signal having a wavelength within the range of wavelengths identified in the coarse wavelength measurement such that the detector array generates the partial interferogram that yields the precise wavelength of the input optical signal.

5. The wavemeter system of claim 1, wherein the wavemeter device comprises a memory configured to store a plurality of calibration matrices, each calibration matrix being assigned a respective temperature range, wherein the processing circuitry is further configured to:
    determine a temperature of the optical chip; and
    select the calibration matrix from the plurality of calibration matrices in response to determining the temperature of the optical chip is within the respective temperature range of the calibration matrix.

6. The wavemeter system of claim 1, wherein the detector array comprises a set of photoreceivers, and wherein to generate the partial interferogram, the detector array is configured to:
    capture, using each photoreceiver of the set of photoreceivers, a Fourier sample to obtain a set of Fourier samples, wherein the set of Fourier samples represents an inverse Fourier transform of the optical spectrum of the input optical signal, and wherein to calculate the optical spectrum, the processing circuitry is configured to:
    calculate the optical spectrum of the input optical signal based on the set of Fourier samples.

7. The wavemeter system of claim 1, wherein the processing circuitry is further configured to determine whether a signal to noise ratio (SNR) associated with the partial interferogram is below an SNR threshold.

8. The wavemeter system of claim 7, wherein the partial interferogram is a first partial interferogram, and wherein if the SNR is below the SNR threshold, the processing circuitry is configured to:
    adjust an exposure time associated with the detector array, and wherein the detector array is further configured to:
    generate a second partial interferogram based on the at least the portion of the input optical signal.

9. The wavemeter system of claim 7, wherein if the SNR is not below the SNR threshold, the processing circuitry is configured to:
    calculate the optical spectrum of the input optical signal based on the partial interferogram and the calibration matrix.

10. The wavemeter system of claim 1, wherein to calculate the optical spectrum, the processing circuitry is configured to:
    calculate the optical spectrum using a compressive sensing retrieval operation.

11. The wavemeter system of claim 1, wherein each optical chip of the set of optical chips represents a set of waveguides including a respective set of interferometers.

12. A method for determining a precise wavelength of an input optical signal using a wavemeter device, the method comprising:
  generating, by a coarse wavelength unit of the wavemeter device, a coarse wavelength measurement of the input optical signal;
  selecting, by processing circuitry of the wavemeter device, an optical chip from a plurality of optical chips, the optical chip corresponding to a range of wavelengths identified in the coarse wavelength measurement;
  generating, using a detector array coupled to the optical chip, a partial interferogram based on the at least the portion of the input optical signal;
  calculating, by the processing circuitry, an optical spectrum of the input optical signal based on the partial interferogram corresponding to the at least the portion of the input optical signal and a calibration matrix for the wavemeter device; and
  identifying, by the processing circuitry and based on the optical spectrum of the input optical signal, the precise wavelength of the input optical signal.

13. The method of claim 12, wherein generating the coarse wavelength measurement comprises generating the coarse wavelength measurement using arrayed waveguide grating (AWG).

14. The method of claim 12, wherein generating the coarse wavelength measurement comprises generating the coarse wavelength measurement using Echelle grating.

15. The method of claim 12, wherein selecting the optical chip from the plurality of optical chips corresponding to the range of wavelengths identified in the coarse wavelength measurement comprises:
  selecting the optical chip from the plurality of optical chips based on the optical chip being configured to process an optical signal having a wavelength within the range of wavelengths identified in the coarse wavelength measurement such that the detector array generates the partial interferogram that yields the precise wavelength of the input optical signal.

16. The method of claim 12, wherein the wavemeter device comprises a memory configured to store a plurality of calibration matrices, each calibration matrix being assigned a respective temperature range, wherein the method further comprises:
  determining, using the processing circuitry, a temperature of the optical chip; and
  selecting, using the processing circuitry, the calibration matrix from the plurality of calibration matrices in response to determining the temperature of the optical chip is within the respective temperature range of the calibration matrix.

17. The method of claim 12, wherein the detector array comprises a set of photoreceivers, and wherein generating the partial interferogram comprises:
  capturing, using each photoreceiver of the set of photoreceivers, a Fourier sample to obtain a set of Fourier samples, wherein the set of Fourier samples represents an inverse Fourier transform of the optical spectrum of the input optical signal, and wherein calculating the optical spectrum comprises:
  calculating the optical spectrum of the input optical signal based on the set of Fourier samples.

18. The method of claim 12, wherein calculating the optical spectrum comprises calculating the optical spectrum using a compressive sensing retrieval operation.

19. The method of claim 12, wherein each optical chip of the set of optical chips represents a set of waveguides including a respective set of interferometers.

20. A wavemeter device for determining a precise wavelength of an input optical signal, the wavemeter device configured to:
  generate, by a coarse wavelength unit of the wavemeter device, a coarse wavelength measurement of the input optical signal;
  select, by processing circuitry of the wavemeter device, an optical chip from a plurality of optical chips, the optical chip corresponding to a range of wavelengths identified in the coarse wavelength measurement;
  generate, using a detector array coupled to the optical chip, a partial interferogram based on the at least the portion of the input optical signal;
  calculate, by the processing circuitry, an optical spectrum of the input optical signal based on the partial interferogram corresponding to the at least the portion of the input optical signal and a calibration matrix for the wavemeter device; and
  identify, by the processing circuitry and based on the optical spectrum of the input optical signal, the precise wavelength of the input optical signal.

* * * * *